Patented Nov. 25, 1930

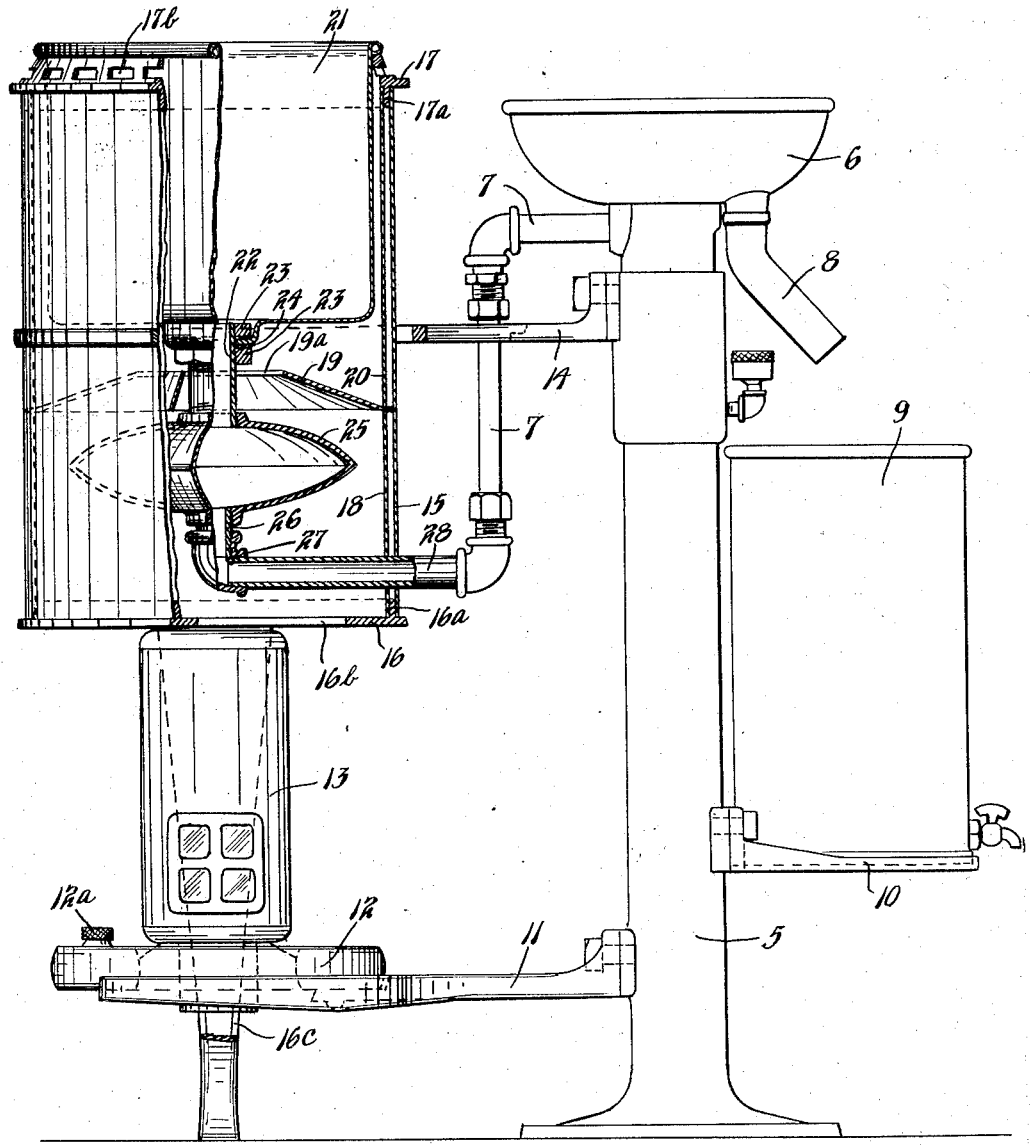

1,782,876

UNITED STATES PATENT OFFICE

DEDRICK A. MAANUM, OF MINNEAPOLIS, MINNESOTA, ASSIGNOR, BY MESNE ASSIGNMENTS, TO CHERRY-BURRELL CORPORATION, OF WILMINGTON, DELAWARE, A CORPORATION OF DELAWARE

CAN-CLEANING-MACHINE HEATER

Application filed March 28, 1927. Serial No. 178,990.

This invention relates to a can cleaning device such as is used to clean milk cans or other containers in which a residue collects, and the invention is particularly directed to that portion of a can cleaner in which the water used is heated. In the milk industry the milk is collected from the dairies in cans and taken either as milk or as the cream separated from the milk, to collecting stations or creameries. It is necessary to clean the cans in which the milk or cream is transported and in fact, such cleaning is required by law in some States.

In these cream collecting stations and small creameries there is often no supply of boiler steam and no supply of gas for heating purposes. It is desirable, therefore, to have a can cleaning machine which does not require a supply of gas for heating purposes, but which is self-contained and has its own water heating means. Can cleaning machines have heretofore been provided using a heating coil in combination with a heating stove, but trouble has been experienced with the coils collecting scale in some localities.

It is an object of this invention, therefore, to provide a simple and efficient water heating means for a can washing machine in which no coil is used, but which has means for containing a small amount of water to be heated, in combination with a water container.

It is a further object of the invention to provide simple and efficient water heating means for a can cleaning machine comprising a water container and a smaller water container disposed below and connected to the bottom of said first mentioned container, said latter container having a discharge means leading from the bottom thereof adapted to supply water to the can cleaning machine, heating means being provided under said last mentioned container.

It is a further object of the invention to provide such a device as set forth in the preceding paragraph, said containers being disposed in a casing, at the lower end of which said heating means is disposed, together with a deflector disposed between said containers.

These and other objects and advantages of the invention will be fully set forth in the following description made in connection with the accompanying drawings, in which like reference characters refer to similar parts throughout the several views and in which:—

The single figure is a view partly in side elevation and partly in vertical section of the water heating means, the can cleaning machine being also shown in side elevation.

Referring to the drawings, a can cleaning machine is indicated having a standard 5 at the top of which is supported a bowl 6 adapted to support a milk can in inverted position. A nozzle (not shown) is disposed centrally of the bowl with which communicates a supply pipe 7. A drain pipe 8 is shown as leading from the bowl 6 adapted to discharge into a container 9 disposed on a bracket 10 carried on the standard 5. Means are also provided in connection with the standard 5 for forcing the water through the nozzle. Such a machine as illustrated is shown and described in applicant's Patent No. 1,620,116, granted March 8, 1927. The standard 5 also has bolted to one side thereof a bracket 11, the outer end of which is bifurcated and adapted to embrace and support an oil reservoir 12 which in turn supports and has upstanding therefrom a stove 13. Said container 12 is shown as provided with a filling cap $12^a$ and said container and stove may be of any well known or a suitable type of stove using a liquid fuel. A bracket 14 is secured to the top of the standard 5 which extends about and closely fits a cylindrical casing 15. The casing 15 fits about a cylindrical flange $16^a$ of a lower plate 16 having a central opening $16^b$ therein which is disposed above the stove 13. The member 16 is supported by a pair of legs $16^c$ extending from opposite sides thereof downwardly at each side of the stove 13 and bracket 11, into engagement with the supporting surface. The casing 15 at its upper end fits about a cylindrical flange $17^a$ on a member 17 which extends outward of the casing 15 and has an upwardly extending conical portion in which are formed a plurality of circumferentially spaced openings 17b. A cylindrical casing 18, which, like the casing 15, is of thin sheet metal, fits about the inner side of the flange 16a and rests on the member 16. A fustro-conical deflector plate 19 is disposed on the casing 18 and extends over the top thereof, the same extending substantially into contact with the inner surface of the casing 15. The member 19 is open at its lower side and has an opening 19a disposed centrally in its top. Another casing 20 of substantially the same diameter as casing 18 rests at its lower end on the deflector 19 and at its upper end fits about the inner side of the flange 17a, member 17 extending over the top of casing 20. A cylindrical open top container 21 fits within the opening in the top of member 17 and has a circumferentially extending projection illustrated as a rolled bead engaging the top of member 17 and supporting the member 21. The container 21 is shown as having a depressed portion at its center having a central opening therein into which extends a pipe 22. Nuts 23 are threaded on the upper end of pipe 22 at each side of the bottom of the container 21 and gaskets 24 are clamped between said nuts at each side of the container 21, thus forming a water-tight joint. Pipe 22 is threaded at its lower end into the top of a container 25 of lenticular shape. A nipple 26 is threaded into the bottom of member 25 and communicates therewith and is in turn connected to an elbow 27 into which extends a pipe 28 connected by suitable pipe connections to the pipe 7.

In operation the container 21 will be filled with water substantially to its top. This water will pass down through the pipe 22 into container 25 and the pipes 28 and 7 will, of course, be filled. The stove 13 will be lighted and the heat therefrom will pass upwardly into the casing 18 and against the member 25. The heat or heated air and products of combustion will be deflected inwardly by the deflector 19 and will then pass through the central opening therein upwardly around the tank 21 and out at the openings 17b. The water in container 25 will thus be effectively heated and the water in container 21 will also be heated. If any steam should be generated in member 25, it will merely pass up through pipe 22 to the water in container 21 and will be condensed therein, thus assisting in heating the water in vessel 21. In one form of the machine the member 25 contains about two quarts of water and this very hot water is always available when the water is to be drawn into the can cleaning machine. The heat is retained within the casings 15 and 18 which have an air space therebetween so that said heat is effectively and efficiently use. If any scale should collect in the member 25, said member can be easily removed and cleaned. With the small copper coils previously used it was necessary to replace the coil with a new one if the coil became clogged with scale. When the supply line 7 is open the hot water from member 25 passes out through delivery pipe 28 to the can cleaning machine.

From the above description it is seen that applicant has provided a very simple and efficient hot water heating means for a can cleaning machine. The device is simple in construction, easily made and assembled and provides at all times a sufficient quantity of very hot water to effectively clean two cans. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claim.

What is claimed is:

A water heater comprising a burner, a top annular plate and a bottom annular plate having opposing flanges, an outer casing arranged between said plates and on the outside of said flanges above the heater, a lower inner casing spaced from the outer casing and supported on the bottom plate inside of its flange, an upper inner casing supported in engagement with the top plate on the inside of its flange, a main water container supported within the upper inner casing, an outlet pipe passing through the lower inner casing and the outer casing, a lenticular container connected with and supported by said outlet pipe, a pipe connecting the top of the lenticular container with the bottom of the main container, and a frusto-conical deflector arranged between the lenticular container and the main container with its peripheral margin located between the lower and upper inner casings.

In testimony whereof I affix my signature.

DEDRICK A. MAANUM.